United States Patent
Yoon

(10) Patent No.: US 11,346,978 B2
(45) Date of Patent: May 31, 2022

(54) ROBOT ARM MECHANISM

(71) Applicant: LIFE ROBOTICS INC., Tokyo (JP)

(72) Inventor: Woo-Keun Yoon, Tokyo (JP)

(73) Assignee: LIFE ROBOTICS INC., Tokyo (JP)

( * ) Notice: Subject to any disclaimer, the term of this patent is extended or adjusted under 35 U.S.C. 154(b) by 606 days.

(21) Appl. No.: 16/393,554

(22) Filed: Apr. 24, 2019

(65) Prior Publication Data

US 2019/0250304 A1 Aug. 15, 2019

Related U.S. Application Data

(63) Continuation of application No. PCT/JP2017/039099, filed on Oct. 30, 2017.

(30) Foreign Application Priority Data

Oct. 31, 2016 (JP) .............................. JP2016-213591

(51) Int. Cl.
 *B25J 19/02* (2006.01)
 *G01V 8/22* (2006.01)
 (Continued)

(52) U.S. Cl.
 CPC .............. *G01V 8/22* (2013.01); *B25J 9/1674* (2013.01); *B25J 9/1694* (2013.01); *B25J 13/089* (2013.01); *B25J 19/02* (2013.01); *B25J 19/06* (2013.01)

(58) Field of Classification Search
 CPC ........ B25J 13/089; B25J 19/02; B25J 19/021; B25J 9/1674; B25J 9/1694
 (Continued)

(56) References Cited

U.S. PATENT DOCUMENTS 9,195,226 B2 * 11/2015 Zhuan ................... G05B 19/401
2012/0253511 A1 * 10/2012 Saeki ................ H01L 21/67742
700/245
(Continued)

FOREIGN PATENT DOCUMENTS

JP S60-071195 A 4/1985
JP S62-85394 U 5/1987
(Continued)

OTHER PUBLICATIONS

International Search Report issued in PCT/JP2017/039099 dated Jan. 30, 2018 with English Translation (5 pages).
(Continued)

*Primary Examiner* — Dalena Tran
(74) *Attorney, Agent, or Firm* — Nakanishi IP Associates, LLC

(57) ABSTRACT

A robot arm mechanism has a plurality of link sections. The plurality of link sections are connected by a plurality of joints. Each of the link sections is provided with a plurality of photoelectric sensors. The photoelectric sensor is constituted of a light projecting section and a light receiving section. The light projecting section is installed at one end of the link section. The light receiving section is installed at the other end of the link section. On an outside of the link section, an optical path reaching the light receiving section from the light projecting section is positioned. Approach of a worker to the link section can be detected by the optical path of any of the photoelectric sensors being cut off.

5 Claims, 8 Drawing Sheets

(51) Int. Cl.
  *B25J 9/16*   (2006.01)
  *B25J 13/08*  (2006.01)
  *B25J 19/06*  (2006.01)
(58) Field of Classification Search
  USPC .......... 700/250; 359/385, 471; 356/400, 218
  See application file for complete search history.

(56) References Cited

U.S. PATENT DOCUMENTS

| | | |
|---|---|---|
| 2013/0068061 A1 | 3/2013 | Yoon |
| 2015/0343648 A1 | 12/2015 | Yoon |
| 2018/0093378 A1* | 4/2018 | Yamamoto ............. B25J 9/1676 |
| 2018/0257229 A1* | 9/2018 | Wakita .................... B25J 19/06 |

FOREIGN PATENT DOCUMENTS

| | | |
|---|---|---|
| JP | S63-4295 U | 1/1988 |
| JP | S63-27298 U | 2/1988 |
| JP | H3-289310 A | 12/1991 |
| JP | 2000-162062 A | 6/2000 |
| JP | 2009-092655 A | 4/2009 |
| JP | 5435679 B2 | 3/2014 |

OTHER PUBLICATIONS

Office Action issued in Japanese Patent Application No. 2018-547820 dated Oct. 13, 2020 (8 pages).

\* cited by examiner

ROBOT ARM MECHANISM

CROSS-REFERENCE TO RELATED APPLICATIONS

This application is a continuation application of International Patent Application No. PCT/JP2017/039099 filed on Oct. 30, 2017, which claims priority to Japanese Patent Application No. 2016-213591, filed Oct. 31, 2016, the entire contents of which are incorporated by reference.

FIELD

Embodiments described herein relate generally to a robot arm mechanism.

BACKGROUND

Conventionally, an articulated robot arm mechanism is used in various fields such as an industrial robot. A polar coordinates robot is highly safe because the polar coordinates robot is not equipped with an elbow joint, but has been applied to only specific fields because the polar coordinates robot has a small movable area. The linear extension and contraction mechanism that is put to practical use by the inventors has a long extension and contraction length than the conventional linear motion mechanism and realizes a wide movable area. Thereby, it becomes possible to apply the linear extension and contraction mechanism to various fields, and an environment in which the robot and a worker cooperate with each other becomes realistic. In the cooperative environment where the robot is close to a worker, higher safety is required of the robot. Therefore, in many robots, the arm sections, the wrist sections and the like are equipped with contact sensors or proximity sensors.

In order to enhance safety, it is necessary to enlarge the sensitivity range comprehensively by disposing a number of sensors minutely, but this is not realistic because in that case, not only increase in cost but also increase in weight of the arm section and the like is unavoidable. Further, the arm section which is given an extension and contraction property by the linear extension and contraction mechanism is stored in the support column section with contraction, so that it is difficult to equip a contact sensor and a proximity sensor in a middle of the arm section, and a blind area is unavoidable.

CITATION LIST

Patent Literature

Patent Literature 1: Japanese Patent No. 5435679

SUMMARY OF INVENTION

Technical Problem

A purpose is to simplify a structure, enlarge a sensitivity range, and thereby realize enhancement of safety, in a robot arm mechanism.

Solution to Problem

A robot arm mechanism according to the present embodiment is formed by a link section being supported by a joint. At least one photoelectric sensor is installed on a link section or a joint in such a manner that an optical path of detection light is positioned over at least both ends of the link section, on an outside of the link section.

DETAILED DESCRIPTION

Figure 1A:
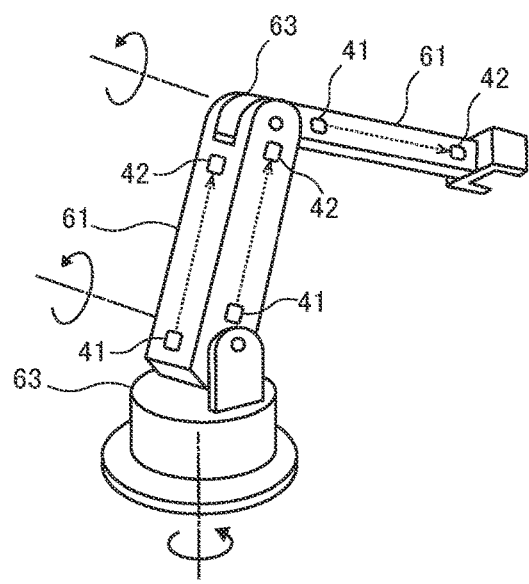
FIGS. 1A, 1B, 1C, and 1D are perspective views illustrating external appearances of various types of robot arm mechanisms to which the present embodiment is applied.
Figure 1B:
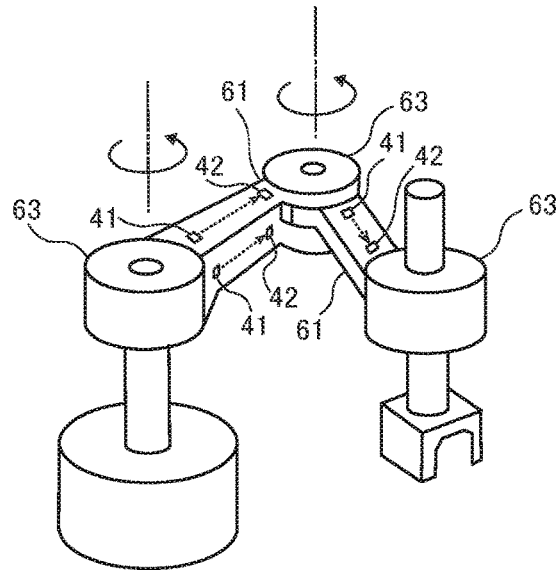
Figure 1C:
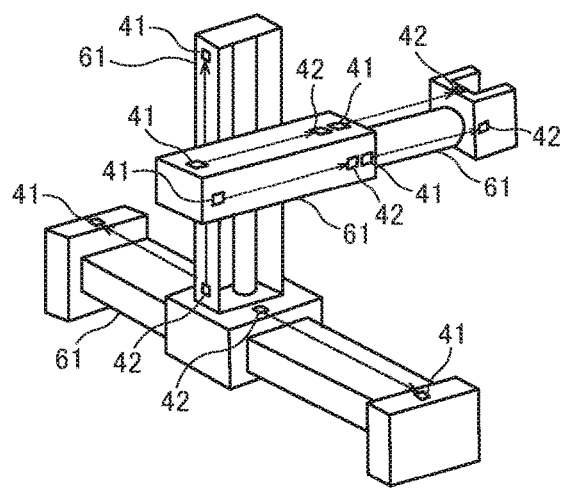
Figure 1D:
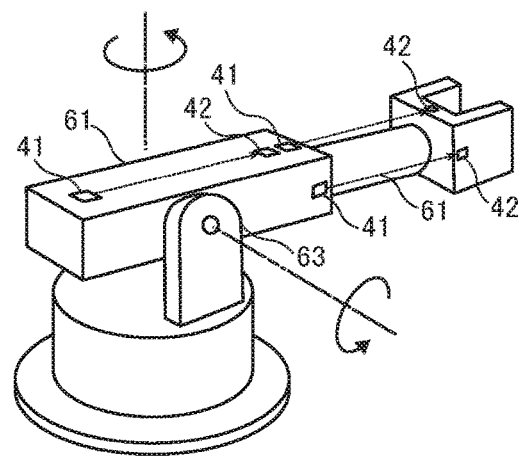

Hereinafter, a robot arm mechanism according to the present embodiment will be described with reference to the drawings. There exist a plurality of types of robot arm mechanisms. FIG. 1A illustrates a vertical articulated robot arm mechanism, FIG. 1B illustrates a horizontal articulated robot arm mechanism (SCARA robot arm mechanism) that has two parallel rotation joints and operates within a selected plane, FIG. 1C illustrates an orthogonal triaxial robot arm mechanism having three linear motion joints, in which these movement axes are orthogonal to each other, and FIG. 1D illustrates a polar coordinates robot arm mechanism having two rotation joints and one linear motion joint in the arm, in which these axes constitute a polar coordinate system. Besides, there are a parallel link robot arm mechanism that has a link configuring a closed loop structure in an arm, a cylindrical coordinate robot arm mechanism having at least one rotation joint and one linear motion joint in an arm, in which these axes configure a cylindrical coordinate system, and the like. The present embodiment is not limited to a specific type, but can be applied to an arbitrary type robot arm mechanism. The present embodiment is a robot arm mechanism that is formed by at least one link (also referred to as the arm section) being supported by at least one joint.

The robot arm mechanism according to the present embodiment is provided with a simple configuration in which a single joint is installed on an installment surface such as a floor surface, a wall surface and a ceiling surface, and a single link section is rotatably or movably supported by the joint, or a general configuration in which a plurality of link sections are connected via joints. FIGS. 1A to 1D illustrate examples of the general configuration, and the robot arm mechanism according to the present embodiment may be of any type. Here, a polar coordinates robot arm mechanism will be described as an example.

In the present embodiment, a photoelectric sensor 40 is adopted to detect approach of a worker or the like to link sections constituting various types of robot arm mechanisms. The photoelectric sensor 40 may be of either a transmission type or a reflective type. When the photoelectric sensor 40 is of a transmission type, the photoelecsensor 40 has a light projecting section 41 and a light receiving section 42. When the photoelectric sensor 40 is of a reflective type, the photoelectric sensor 40 has a light projecting/receiving section and a reflection section. Here, a transmission type of photoelectric sensor will be described as an example. The light projecting section 41 is installed in a position that is at one end side of a link section 61, and on an outside with respect to a perpendicular direction from a center axis of the link section 61. The light receiving section 42 is installed in a position that is at the other end side of the link section 61 and on an outside with respect to a perpendicular direction from the center axis of the link section 61. Thereby, an optical path of detection light reaching the light receiving section 42 from the light projecting section 41 extends substantially parallel with the center axis from the one end to the other end, on an outside of the link section 61. As a matter of course, the optical path of the detection light is not limited to a range from the one end to the other end of the link section 61, but may exceed the range. Thereby, no blind section exists along a length direction of the link section 61, and an entire area thereof can be made a detection area, so that safety can be enhanced. By arranging four of the photoelectric sensors 40 on four sides, an up, down, left and right to the link section 61, the four optical paths of detection light can surround the link section 61 from the four sides, and even when approach is made to the link section 61 from any of the four directions, the approach is detected, so that safety can be more enhanced. Safety can be more enhanced by installing an area sensor in which a larger number of photoelectric sensors 40 are minutely arranged in a circular ring shape or an angular ring shape.

Figure 2:
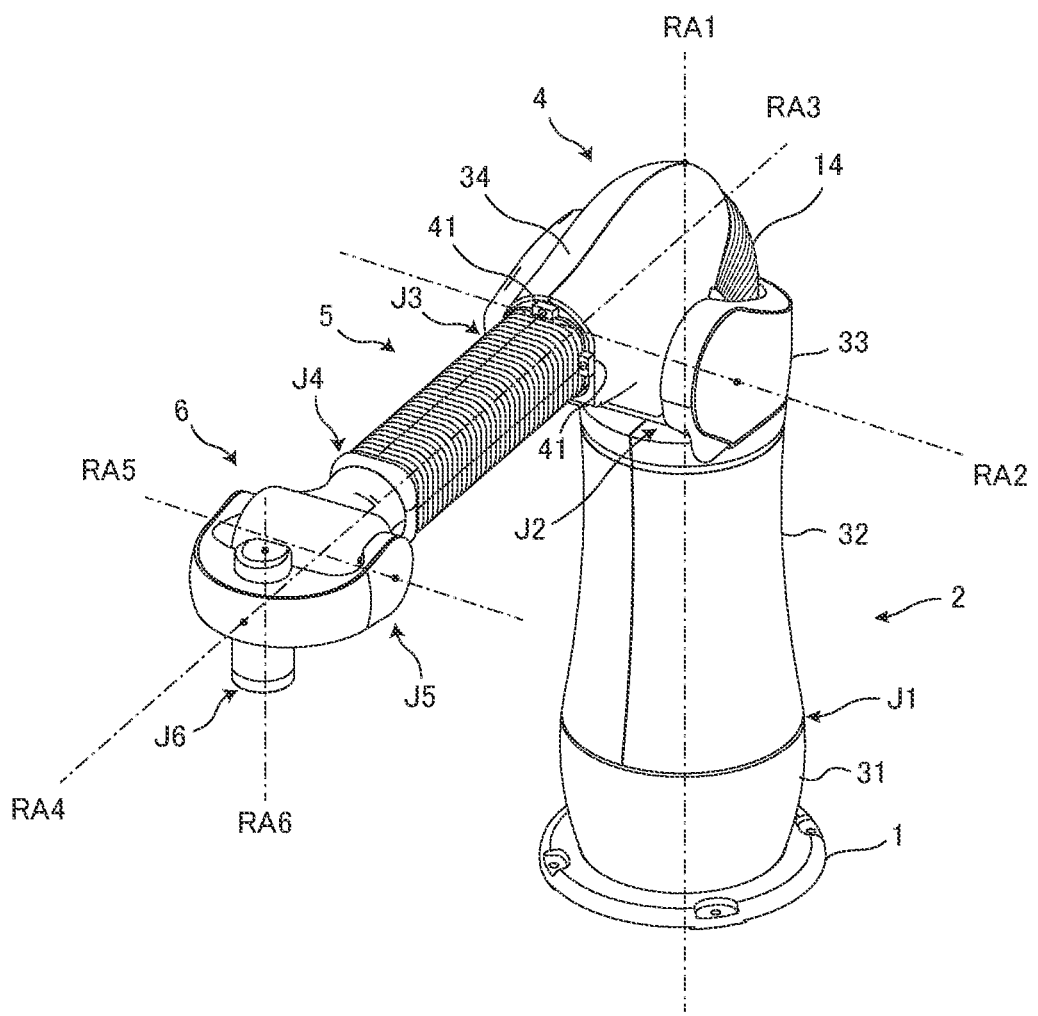
FIG. 2 is a perspective view illustrating an example of the polar coordinates robot in FIG. 1.
Figure 3:
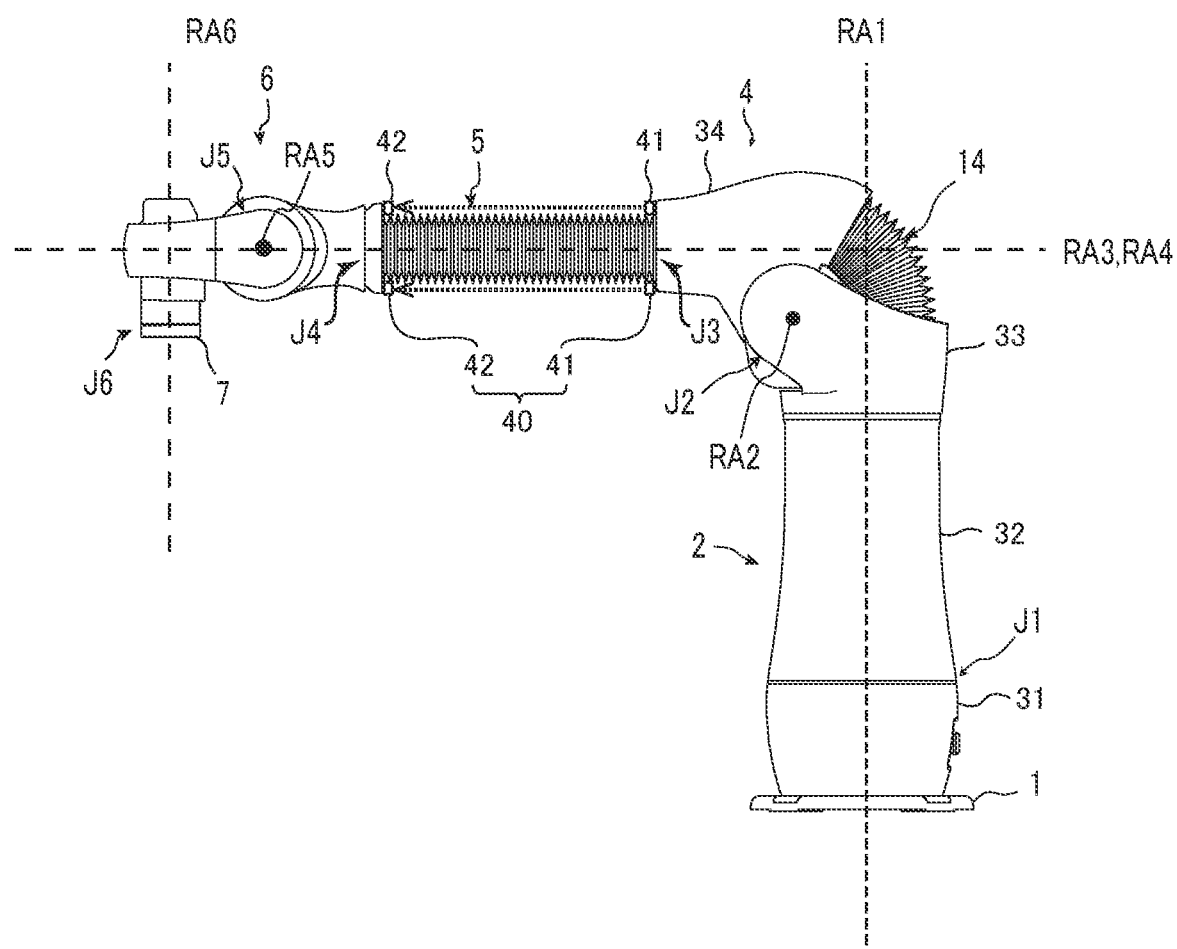
FIG. 3 is a side view of the robot arm mechanism in FIG. 2.
Figure 4:
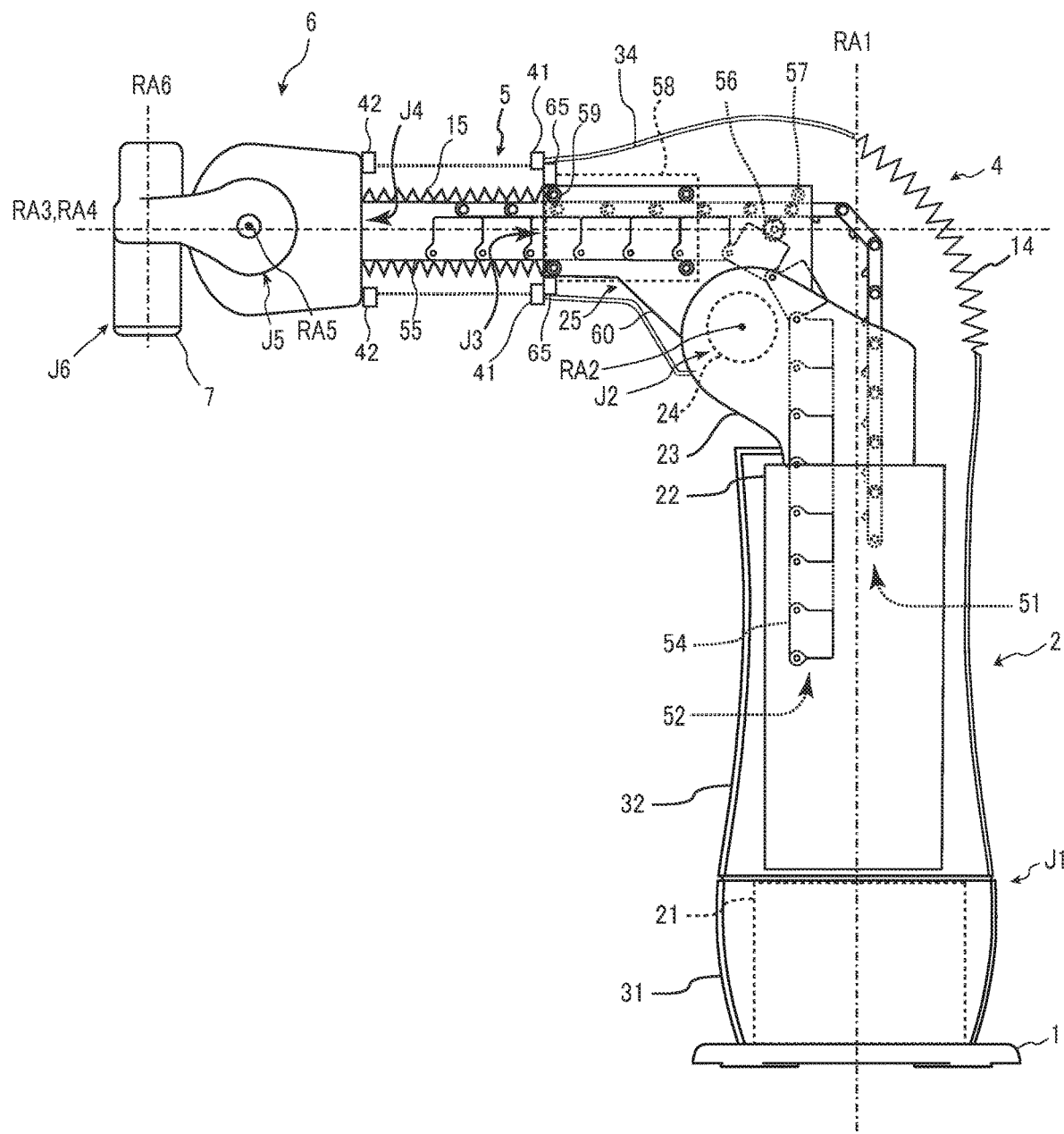
FIG. 4 is a view illustrating an internal configuration of the robot arm mechanism in FIG. 2.

Hereinafter, the present embodiment will be described in detail with a polar coordinates robot arm mechanism taken as an example. First, a basic structure of the polar coordinates robot arm mechanism will be described. FIG. 2 illustrates an external appearance of the polar coordinates robot arm mechanism according to the present embodiment, FIG. 3 illustrates a side view of the robot arm mechanism, and FIG. 4 illustrates an internal structure of the robot arm mechanism. The robot arm mechanism includes a base 1, a turning section 2, a rising and lowering section 4, an arm section (link section) 5 and a wrist section 6 in order from the base 1. A plurality of joints J1, J2, J3, J4, J5 and J6 are arranged in order from the base 1. The turning section 2 forming a cylindrical body is typically installed vertically on the base 1. The turning section 2 stores the first joint J1 as a turning rotation joint. The first joint J1 includes an axis of rotation RA1. The axis of rotation RA1 is parallel with a vertical direction. The turning section 2 has a lower frame (link section) 21 and an upper frame (link section) 22. The lower frame 21 and the upper frame 22 are connected at the first joint J1. The frames 21 and 22 are respectively covered with cylindrical housings 31 and 32. The upper frame 22 axially rotates with rotation of the first joint J1, and thereby the arm section 5 turns horizontally. In an internal hollow of the turning section 2 forming a cylindrical body, a first and second piece strings 51 and 52 of the third joint J3 as a linear extension and contraction mechanism that will be described later are stored.

On the upper frame 22, the second joint J2 as a rising and lowering rotation joint is installed. The second joint J2 is a rotation joint. An axis of rotation RA2 of the second joint J2 is a horizontal axis. A pair of side frames 23 that constitute the second joint J2 are covered with a cover 33 in a saddle shape. A cylindrical body 24 that is also used as a motor housing is supported by the pair of side frames 23 to be axially rotatable. A motor (actuator) is fixed to an inside of the cylindrical body 24. A rotating shaft of the motor is fixed to the side frames 23. The cylindrical body 24 axially rotates with rotation of the motor. A feeding mechanism 25 of the third joint J3 is fixed to an outer circumferential surface of the cylindrical body 24. The feeding mechanism 25 is covered with a cover 34. A gap between the covers 33 and 34 is covered with a U-shaped bellows cover 14 that is U-shaped in section. The U-shaped bellows cover 14 extends and contracts by following a rising and lowering motion of the second joint J2. The feeding mechanism 25 is formed by a drive gear 56, a guide roller 57 and a roller unit 58 being supported by a box-shaped frame 60. The feeding mechanism 25 supports the arm section 5 movably back and forth. The feeding mechanism 25 rotates with axial rotation of the cylindrical body 24, and the arm section 5 rises and lowers vertically.

The third joint J3 is provided by the linear extension and contraction mechanism. The linear extension and contraction mechanism includes a structure which is newly developed by the inventors, and is clearly distinguished from a so-called conventional linear motion joint from a viewpoint of a movable range. The arm section 5 of the third joint J3 is bendable, but is restricted from bending when the arm section 5 is fed forward from the feeding mechanism 25 at a root of the arm section 5 along a center axis (center axis of extension and contraction RA3) and has linear rigidity ensured to configure the link section. When the arm section 5 is pulled backward, bending is restored. The arm section 5 has the first piece string 51 and the second piece string 52. The first piece string 51 is constituted of a plurality of first pieces 53 that are bendably connected. The first piece 53 is formed into a substantially flat plate shape, for example. The first pieces 53 are bendably connected at hinge portions at end spots. The second piece string 52 is constituted of a plurality of second pieces 54. The second piece 54 is formed into a cylindrical body U-shaped in section or rectangular in section, with one surface opened, for example. The second pieces 54 are bendably connected at hinge portions at bottom plate end spots. Bend of the second piece string 52 is restricted in a position where end surfaces of side plates of the second pieces 54 abut on each other. In that position, the second piece string 52 is linearly arranged. The leading first piece 53 of the first piece string 51 and the leading second piece 54 of the second piece string 52 are connected by a head piece 55.

The first and second piece strings 51 and 52 are brought into contact with each other by being pressed to each other by rollers 59 when passing through the roller unit 58 of the feeding mechanism 25. Thereby, the first and second piece strings 51 and 52 exhibit linear rigidity and configure the columnar arm section (link section) 5. The arm section 5 exits from a flange 65 in an angular ring shape of the frame 60 of the feeding mechanism 25. The drive gear 56 is disposed with the guide roller 57 behind the roller unit 58. The drive gear 56 is connected to a motor unit not illustrated. The motor unit generates power for rotating the drive gear 56. Though not illustrated, a linear gear is formed along a connecting direction in a width center of an inside surface of the first piece 53, in other words, a surface on a side contacting the second piece 54. When the plurality of first pieces 53 are lined up linearly, adjacent linear gears are connected linearly, and configures an integral long linear gear. The linear gear of the first piece 53 is meshed with the drive gear 56 by being pressed by the guide roller 57. The linear gears which are connected linearly configure a rack and pinion mechanism with the drive gear 56. When the drive gear 56 rotates forward, the first and second piece strings 51 and 52 are fed forward from the roller unit 58. When the drive gear 56 rotates reversely, the first and second piece strings 51 and 52 are pulled backward of the roller unit 58. The first and second piece strings 51 and 52 which are pulled back are separated between the roller unit 58 and the drive gear 56. The first and second piece strings 51 and 52 which are separated respectively return to a bendable state. The first and second piece strings 51 and 52 which return to the bendable state both bend in a same direction (inward), and are vertically stored inside the turning section 2. At this time, the first piece string 51 is stored in a state substantially aligned in substantially parallel with the second piece string 52.

The wrist section 6 is attached to a tip end of the arm section 5. The wrist section 6 is equipped with the fourth to sixth joints J4 to J6. The fourth to sixth joints J4 to J6 respectively include axes of rotation RA4 to RA6 which are orthogonal three axes. The fourth joint J4 is a rotation joint rotating on the fourth axis of rotation RA4 that substantially corresponds to the center axis of extension and contraction RA3, and the end effector is swingably rotated by rotation of the fourth joint J4. The fifth joint J5 is a rotation joint rotating on the fifth axis of rotation RA5 which is disposed perpendicular to the fourth axis of rotation RA4, and the end effector is tilted and rotated back and forth by rotation of the fifth joint J5. The sixth joint J6 is a rotation joint rotating on the sixth axis of rotation RA6 which is disposed perpendicularly to the fourth axis of rotation RA4 and the fifth axis of rotation RA5, and the end effector is axially rotated by rotation of the sixth joint J6.

The end effector (end effector) not illustrated is attached to an adapter 7 that is provided at a lower part of a rotating section of the sixth joint J6 of the wrist section 6. The end effector is a portion for the robot to have a function of directly working on an object to be worked (work), and various tools exist in accordance with tasks, such as a grasping section, a vacuum suction section, a nut fastening tool, a welding gun, and a spray gun, for example. The end effector is moved to an arbitrary position by the first, second and third joints J1, J2 and J3, and is disposed in an arbitrary posture by the fourth, fifth and sixth joints J4, J5 and J6. In particular, a length of an extension and contraction distance of the arm section 5 of the third joint J3 enables the end effector to reach objects in a wide range from a proximity position to a remote position of the base 1. The third joint J3 is clearly distinguished from the conventional linear motion mechanism from a viewpoint of the linear extension and contraction motion and the length of the extension and contraction distance which are realized by the linear extension and contraction mechanism that configures the third joint J3.

Figure 5:
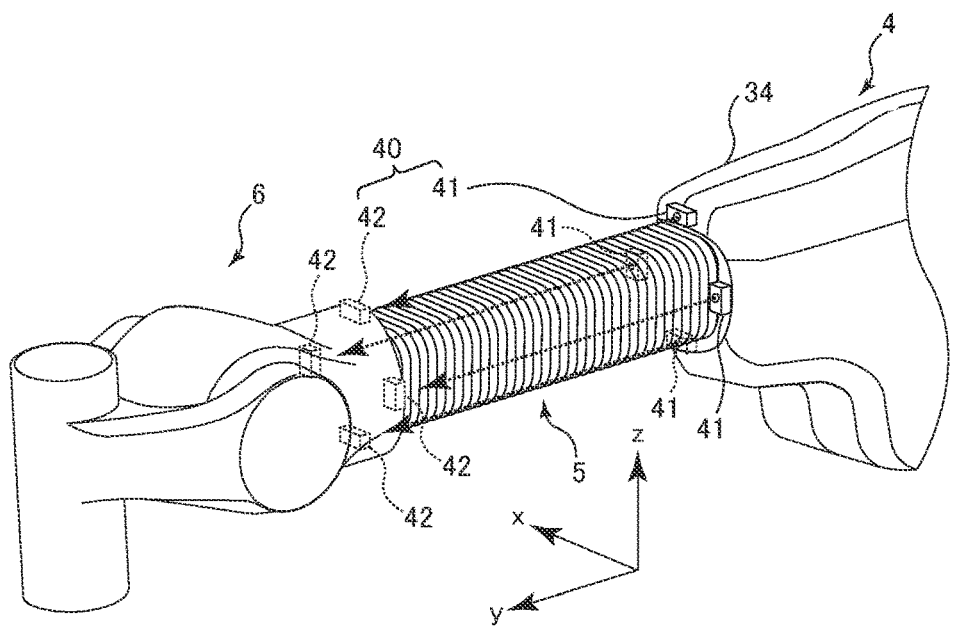
FIG. 5 is an enlarged view of an extension and contraction arm section in FIG. 2.

As illustrated in FIG. 5, at one end side of the arm section 5, for example, a rear end side, the light projecting section 41 constituting the photoelectric sensor 40 is installed, and at the other end side, for example, a front end side, the light receiving section 42 constituting the photoelectric sensor 40 is installed. Note that the light projecting section 41 may be installed at the front end side of the arm section 5, and the light receiving section 42 may be installed at the rear end side. The photoelectric sensor 40 may be of either a transmission type or a reflective type as described above, but is described as a transmission type herein. In the case of the reflective type, the light projecting section shall be read as a light projecting/receiving section, and the light receiving section shall be read as a reflection section respectively.

A wavelength band used for the photoelectric sensor 40 may be of either near-infrared light or visible light, or beam light or laser light. Adoption of visible light has an advantage that the worker or the like can visually recognize detection light around the arm section 5. The light projecting section 41 typically includes a light emitting diode as a light source, but the light source is not limited to a light emitting diode. Further, the photoelectric sensor 40 may be of a so-called amplifier separation type in which the light projecting section 41 and the light receiving section 42 are separated from a unit of a light projecting circuit, a light receiving circuit, a determination circuit, an output circuit and a control circuit that will be described later, or may be of a so-called amplifier incorporated type in which the light projecting section 41 is configured integrally with the light projecting circuit, and the light receiving section 42 is configured integrally with the light receiving circuit, the determination circuit and the output circuit.

Figure 6:
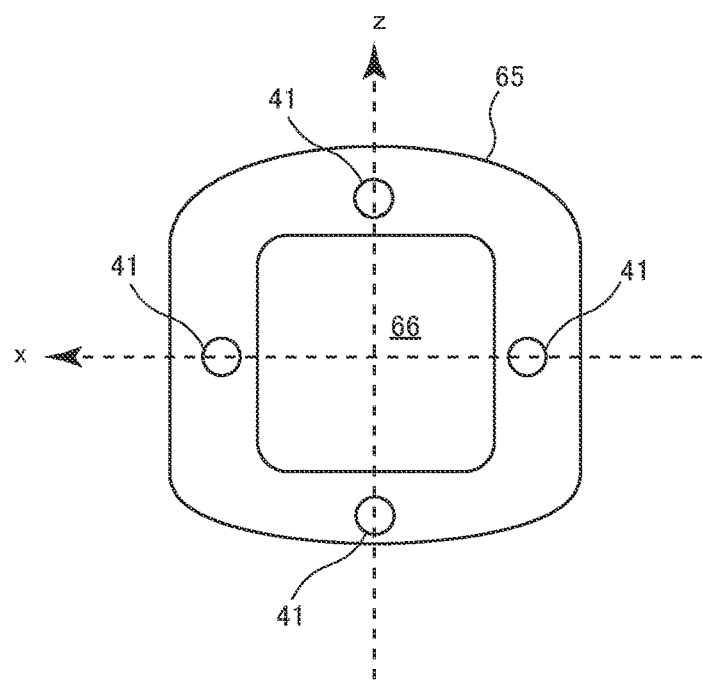
FIG. 6 is a view illustrating a light projector in FIG. 5.

In the present embodiment, the four photoelectric sensors 40 are typically equipped. As illustrated in FIG. 6, the four light projecting sections 41 are attached to the flange 65 of the feeding mechanism 25, for example, at the rear end side of the arm section 5. As a matter of course, an attaching position of the light projecting section 41 is not limited to the flange 65, but the light projecting section 41 may be fitted to a surface of the cover 34, for example. The four light projecting sections 41 are typically staggered by 90 degrees from each other around a conduction hole 66 of the arm section 5, and are disposed by being dispersed vertically and laterally. The four light receiving sections 42 are attached to positions respectively facing the four light projecting sections 41, on a flange of the fourth joint J4 of the wrist section 6 or a cover surface thereof. An optical path of detection light from the light projecting section 41 to the light receiving section 42 extends on outside of the link section 61 in a direction of a length thereof from one end of the link section 61 to the other end. Typically, an optical axis of the detection light is parallel with a center axis of the link section 61. The four optical paths of the four photoelectric sensors 40 surround the link section 61 from four sides, an up, down, left and right.

Figure 7:
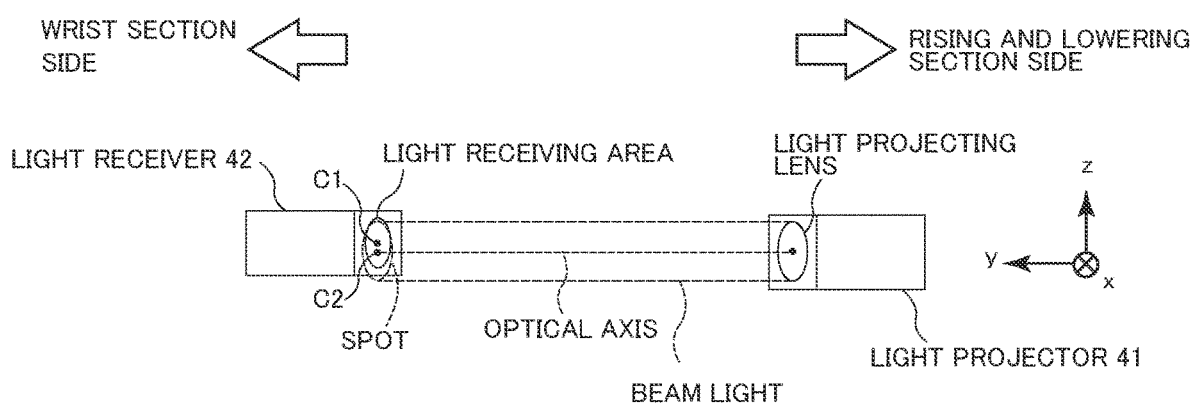
FIG. 7 is a view illustrating a positional relationship of the light projector and a light receiving section in FIG. 5.

The light projecting section 41 and the light receiving section 42 are positioned to each other so that a spot center C2 of beam-shaped detection light, for example, emitted from the light projecting section 41 corresponds to a center C1 of a light receiving area of the light receiving section 42 paired with the light projecting section 41. However, as illustrated in FIG. 7, the light projecting section 41 and the light receiving section 42 may be positioned to each other so that the spot center C2 of the detection light emitted from the light projecting section 41 in a reference posture in which the arm section 5 is most contracted shifts slightly in a direction of gravity from the center C1 of the light receiving area of the light receiving section 42. In a situation where the arm section 5 is extended, and grasps a work as a relatively heavy matter, the arm section 5 is assumed to bend somewhat in the direction of gravity and also vibrate, but even in that case, occurrence of the situation where the beam light is out of the light receiving area of the light receiving section 42 can be reduced.

Figure 8:
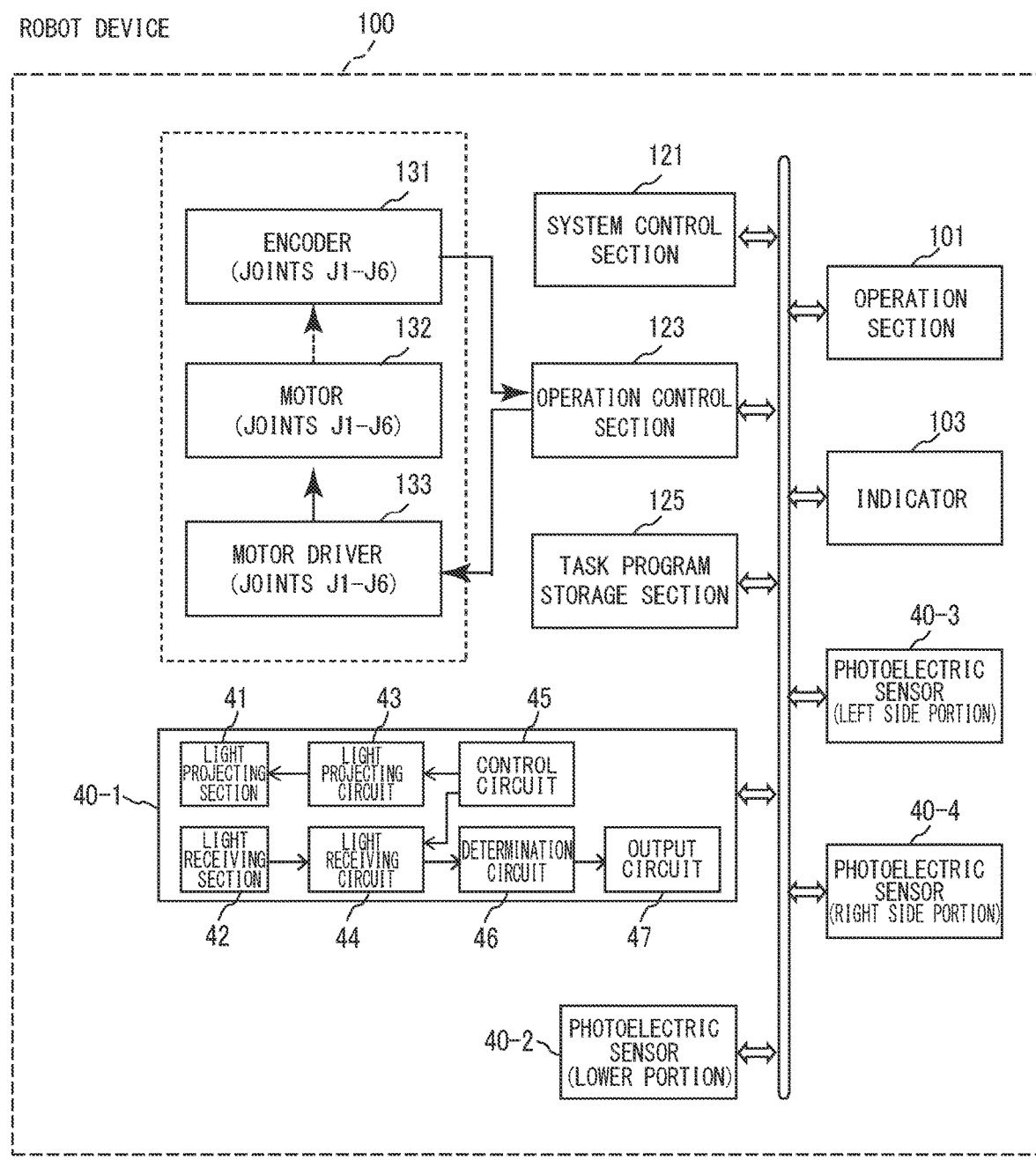
FIG. 8 is functional block diagram of a robot device including the robot arm mechanism in FIG. 2.

FIG. 8 illustrates a configuration of an entire robot device including the robot arm mechanism according to the present embodiment. A robot device 100 has a system control section 121. An upper, lower, left and right photoelectric sensors 40-1 to 40-4 are connected to the system control section 121 via a control/data bus. Further, a task program storage section 125 that stores a data file of a task program, an operation control section 123 that generates joint angles (command values) of the respective joints by using the task program read from the storage section 125, transmits the generated command values to motor drivers 133 of the respective joints, and transmits a stop signal for stopping the motor drivers 133 in that position to the motor drivers 133 of all the joints when a signal expressing that detection light is cut off by a worker or the like is outputted from at least one of the photoelectric sensors 40-1 to 40-4, a command value for energizing in the case of a stepping motor, an indicator 103 that indicates an operation state of the robot device 100 by distinguishing a stopping state and a normal operation state by a lamp, sound or the like, and an operation section 101 equipped with a button for cancelling the operation stoppage and restarting the operation are connected to the system control section 121 via the control/data bus. Operation stop cancel buttons are preferably installed on the rising and lowering section 4 and the wrist section 6. A motor (actuator) 132 of the joint is preferably constituted of a stepping motor. The motor driver 133 supplies pulse power to the motor 132 in accordance with the command value from the operation control section 123. To a drive shaft of the motor or a rotating shaft of the joint, an encoder (rotary encoder) 131 for measuring a rotation angle thereof is attached.

The photoelectric sensor 40-1 is constituted of a light projecting circuit 43 that drives the light projecting section 41 in accordance with control of a control circuit 45, a light receiving circuit 44 that converts a current output of the light receiving section 42 into a voltage signal, amplifies the voltage signal and converts the voltage signal into a digital signal in accordance with control of the control circuit 45, a determination circuit 46 that compares the output signal of the light receiving circuit 44 with a threshold, and an output circuit 47 that alternatively outputs two kinds of signals (codes) expressing two states in accordance with a comparison result, in addition to the light projecting section 41 and the light receiving section 42. When the detection light from the light projecting section 41 is directly received by the light receiving section 42, a first signal (on signal) expressing a first state in which a light receiving amount thereof exceeds a threshold, and nothing is interposed between the light projecting section 41 and the light receiving section 42 is outputted. When a worker or the like approaches the arm section 5 and is interposed between the light projecting section 41 and the light receiving section 42 to cut off the detection light, the light receiving amount of the light receiving section 42 falls below the threshold. Thereby, a second signal (off signal) expressing a second state in which a worker or the like is interposed between the light projecting section 41 and the light receiving section 42 is outputted. By the output of the second signal, the operation control section 123 realizes approach of the worker or the like to the arm section 5, and can stop movement of the arm section 5 before the worker or the like contacts the arm section 5. That is, the operation control section 123 can stop the movement of the arm section 5 when outputting the second signal expressing the state in which the light receiving amount of even one of the photoelectric sensors 40-1 to 40-4 is below the threshold, and further can recognize an approaching direction of the worker or the like from the output signals of the four photoelectric sensors 40-1 to 40-4, so that the operation control section 123 also can retreat the arm section 5 in a same direction as the approaching direction.

The threshold of the determination circuit 46 may be also changed dynamically under control of the control circuit 45. There is a possibility that a light amount of disturbance light that is incident on the light receiving section 42 varies due to the extension and contraction movement, rising and lowering movement and turning movement of the arm section 5. The control circuit 45 dynamically changes the threshold of the determination circuit 46 in response to a combination of an extension and contraction length, a rising and lowering angle and a turning angle which are received at fixed periods from the operation control section 123. Thereby, an erroneous operation of not recognizing cutoff of the detection light by the worker due to an influence of the disturbance light, in particular, because of the light amount of the disturbance light being large, can be suppressed. As a matter of course, it is necessary to measure the light amount change of the disturbance light by the extension and contraction movement, the rising and lowering movement and the turning movement of the arm section 5 in advance. In order to eliminate a working burden of the previous measurement, the determination circuit 46 acquires the light receiving amount of the light receiving section 42 at the fixed period, but when the light receiving amount at a present period is compared with a light receiving amount at immediately preceding period or several periods ago, and when a change of the light receiving amount is within a predetermined range, a state transition is not performed, whereas when the change is out of the predetermined range, the state transition is performed. When the light reception amount at the present period is greatly reduced from the light reception amount at the immediately preceding period, the state is caused to transition to a state where the worker or the like is interposed between the light projecting section 41 and the light receiving section 42 from the state where no worker or the like is interposed between the light projecting section 41 and the light receiving section 42, and the output is converted into the second signal from the first signal. When the light reception amount at the present period increases greatly from the light reception amount at the immediately preceding period, the state is caused to transition to the state where no worker or the like is interposed between the light projecting section 41 and the light receiving section 42 from the state where the worker or the like is interposed between the light projecting section 41 and the light receiving section 42, and the output is converted into the first signal from the second signal. When the light reception amount hardly changes, the state at the immediately preceding period is kept and the first signal or the second signal is continuously outputted.

Either in the case of adopting a transmission type as the photoelectric sensor 40, or in the case of adopting a reflective type, a pulse modulated light method that repeats light projection at fixed periods is adopted to suppress influence of disturbance light. Further, even when the transmission type is adopted as the photoelectric sensor 40, in the case of adopting a reflective type, only reflection light in the reflection section may be detected by disposing polarizing filters different in polarization direction (a longitudinal wave, a transverse wave) are disposed in a light projecting window and a light receiving window of the light projecting/receiving section, and installing a corner tube on a reflection surface of the reflection section, in order to avoid an erroneous operation of a returning light after reflected on an object to be detected such as a worker or the like, being incident on the light projecting/receiving section to be brought into a same state as the state where the object to be detected does not exist.

Further, a time difference between a generation time of optical pulse and a light reception time is compared with a time corresponding to twice the distance between the light projecting/receiving section and the reflection section, and reflection by the reflection section and reflection by the object to be detected such as a worker or the like, that is, presence and absence of interposition of a matter in the optical path may be distinguished in response to the comparison result.

Figure 9:
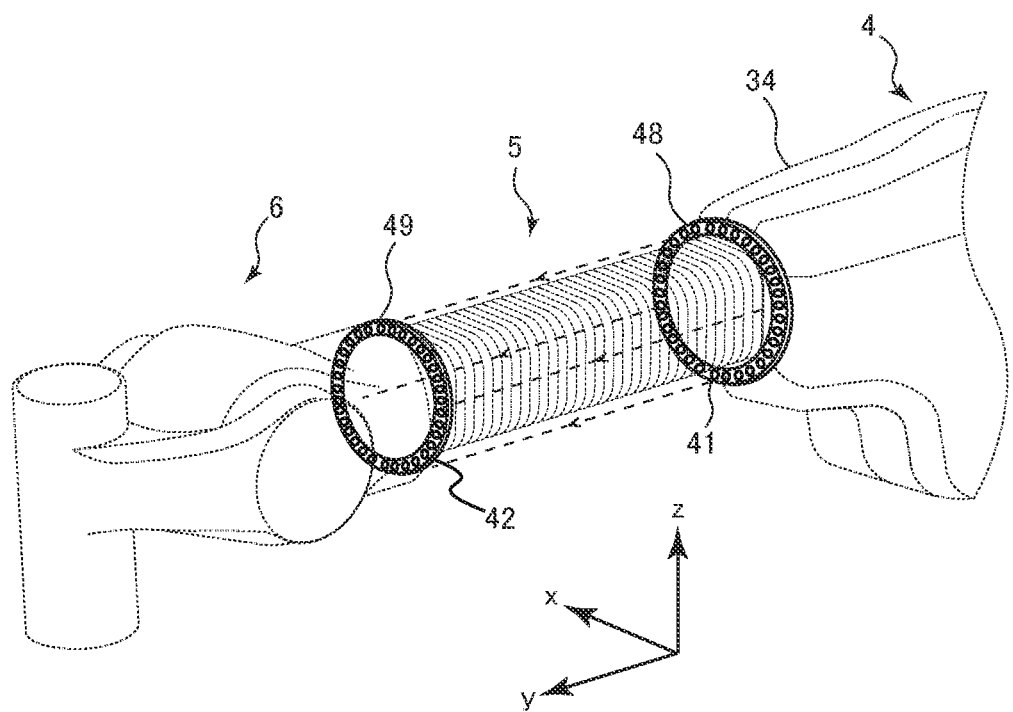
FIG. 9 is a view illustrating a modified example of a photoelectric sensor in FIG. 2.

As illustrated in FIG. 9, an area sensor constituted of a light projecting ring 48 in which a large number of light projecting sections 41 are minutely arranged in a circular ring shape or an angular ring shape, and a light receiving ring 49 in which a large number of light receiving sections 42 are minutely arranged in a circular ring shape or an angular ring shape may be used. As a matter of course, inside diameters or inside dimensions of the light projecting ring 48 and the light receiving ring 49 are longer than an outside diameter or an outside dimension of the arm section 5. A gap in the optical path of the detection light can be eliminated or decreased, a situation where a finger or the like of a worker is inserted in the gap of the optical path of the detection light and approach of the finger or the like cannot be detected can be avoided, and further enhancement in safety can be expected.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

5 . . . Arm section (link section), 40 . . . Photoelectric sensor, 41 . . . Light projecting section, 42 . . . Light receiving section

The invention claimed is:

1. A robot arm mechanism formed by a link section being supported by a joint,
wherein at least one photoelectric sensor is installed at the link section or the joint in such a manner that an optical path of detection light is positioned over at least both ends of the link section on an outside of the link section, and
wherein the robot arm mechanism does not comprise a member to interrupt the optical path of detection light.

2. A robot arm mechanism formed by a link section being supported by a joint,
wherein a light projecting section or a light projecting/receiving section that configures at least one photoelectric sensor of a transmission type or a reflective type is installed at one end side of the link section, a light receiving section or a reflection section is installed at the other end side of the link section to face the light projecting section or the light projecting/receiving section, and an optical path of detection light reaching the light receiving section from the light projecting section, or an optical path of detection light that is from the light projecting/receiving section, and reflects on the reflection section to return to the light projecting/receiving section extends from at least one end through the other end on an outside of the link section, and
wherein the photoelectric sensor includes a light projecting circuit that repeatedly generates the detection light in a pulse form from the light projecting/receiving section, a light receiving circuit that receives reflection light of the detection light via the light projecting/receiving section, and a determination circuit that determines presence or absence of interposition of an object on the optical path in response to a comparison result of a time from generation of the detection light until reception of the reflection light and a time corresponding to twice a distance between the light projecting/receiving section and the reflection section, with the light projecting/receiving section and the reflection section.

3. The robot arm mechanism according to claim 2,
wherein a plurality of the photoelectric sensors are provided, and the plurality of the photoelectric sensors are installed in such a manner that a plurality of optical paths for detection light relating to the plurality of the photoelectric sensors surround the link section from four directions, up, down, left and right.

4. The robot arm mechanism according to claim 3,
wherein the light projecting sections or the light projecting/receiving sections, and the light receiving sections or the reflection sections are arranged in a circular ring shape or an angular ring shape.

5. A robot arm mechanism formed by a link section being supported by a joint,
wherein a light projecting section or a light projecting/receiving section that configures at least one photoelectric sensor of a transmission type or a reflective type is installed at one end side of the link section, a light receiving section or a reflection section is installed at the other end side of the link section to face the light projecting section or the light projecting/receiving section, and an optical path of detection light reaching the light receiving section from the light projecting section, or an optical path of detection light that is from the light projecting/receiving section, and reflects on the reflection section to return to the light projecting/receiving section extends from at least one end through the other end on an outside of the link section, and
wherein the light projecting section or the light projecting/receiving section and the light receiving section or the reflection section are positioned such that a spot center of the detection light is shifted in a direction of gravity in a reference posture with respect to a center of a light receiving surface of the light receiving section or the light projecting/receiving section.

* * * * *